United States Patent
Lu et al.

(10) Patent No.: US 12,438,703 B2
(45) Date of Patent: Oct. 7, 2025

(54) SECURE MULTI-PARTY COMPUTATION METHODS, APPARATUSES, AND SYSTEMS

(71) Applicant: Alipay (Hangzhou) Information Technology Co., Ltd., Zhejiang (CN)

(72) Inventors: Yufei Lu, Hangzhou (CN); Lei Wang, Hangzhou (CN); Chaofan Yu, Hangzhou (CN); Jin Tan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 234 days.

(21) Appl. No.: 18/298,241

(22) Filed: Apr. 10, 2023

(65) Prior Publication Data
US 2023/0327856 A1 Oct. 12, 2023

(30) Foreign Application Priority Data
Apr. 12, 2022 (CN) .......................... 202210380945.5

(51) Int. Cl.
*H04L 9/08* (2006.01)
*H04L 9/00* (2022.01)

(52) U.S. Cl.
CPC ............ *H04L 9/0825* (2013.01); *H04L 9/008* (2013.01); *H04L 9/0869* (2013.01)

(58) Field of Classification Search
CPC ..... H04L 9/0825; H04L 9/008; H04L 9/0869; H04L 9/085; H04L 2209/46; H04L 9/08
See application file for complete search history.

(56) References Cited

U.S. PATENT DOCUMENTS

| | | | |
|---|---|---|---|
| 2021/0168711 A1* | 6/2021 | Zhang | H04L 43/10 |
| 2021/0194668 A1 | 6/2021 | Masters et al. | |
| 2023/0087864 A1* | 3/2023 | Cheng | H04L 9/0618 |
| | | | 380/28 |

FOREIGN PATENT DOCUMENTS

| | | |
|---|---|---|
| CN | 111371545 A | 7/2020 |
| CN | 111740815 A | 10/2020 |

(Continued)

OTHER PUBLICATIONS

Fedai.org [online], "Federated AI Ecosystem," available on or before Apr. 10, 2020, via Internet Archive: Wayback Machine URL<http://web.archive.org/web/20200801000000*/https://cn.fedai.org/>, retrieved on May 15, 2023, URL<https://www.fedai.org/>, 6 pages.

(Continued)

*Primary Examiner* — Quazi Farooqui
(74) *Attorney, Agent, or Firm* — Fish & Richardson P.C.

(57) ABSTRACT

Embodiments of this specification provide computer-implemented methods, apparatuses, computer-readable media, and systems for secure multi-party computation. In an example secure multi-party computation method, a first party encrypts a first plaintext segment of target data by using a homomorphic encryption algorithm based on a public key held by the first party in a first key pair to obtain a first ciphertext segment. A second plaintext segment of the target data is owned by a second party. The first party sends the first ciphertext segment to the second party. The second party performs a homomorphic addition operation in the homomorphic encryption algorithm on the first ciphertext segment and the second plaintext segment of the target data to obtain ciphertext data of the target data. The ciphertext data is decrypted based on a private key in the first key pair.

20 Claims, 8 Drawing Sheets

(56) References Cited

FOREIGN PATENT DOCUMENTS

| | | |
|---|---|---|
| CN | 111783129 A | 10/2020 |
| CN | 112003696 A | 11/2020 |
| CN | 112906044 A | 6/2021 |
| CN | 112989368 A | 6/2021 |
| CN | 114172631 A | 3/2022 |

OTHER PUBLICATIONS

Github.com [online], "FederatedAI," available on or before Apr. 17, 2020, via Internet Archive: Wayback Machine URL<http://web.archive.org/web/20200801000000*/https://github.com/FederatedAI/FATE>, retreived on May 15, 2023, URL<https://github.com/FederatedAI/FATE>, 4 pages.

* cited by examiner

SECURE MULTI-PARTY COMPUTATION METHODS, APPARATUSES, AND SYSTEMS

CROSS-REFERENCE TO RELATED APPLICATIONS

This application claims priority to Chinese Patent Application No. 202210380945.5, filed on Apr. 12, 2022, which is hereby incorporated by reference in its entirety.

TECHNICAL FIELD

One or more embodiments of this specification relate to the field of security technologies, and in particular, to secure multi-party computation methods, apparatuses, and systems.

BACKGROUND

SMPC is referred to as secure multi-party computation. To be specific, a plurality of parties jointly calculate a result of a function without leaking out input data of various parties in the function, and the calculated result is disclosed to one or more of these parties.

Homomorphic encryption (HE) and secret sharing (SS) are two most commonly used cryptographic protocols in secure multi-party computing scenarios. In conventional technologies, homomorphic encryption and the secret sharing are generally considered as two independent protocols. A plaintext is either encrypted through the homomorphic encryption or the secret sharing. The two protocols cannot be used in combination. As a result, performance of the secure multi-party computation is greatly affected.

SUMMARY

One or more embodiments of this specification describe secure multi-party computation methods, apparatuses, and systems to implement mutual conversion of encrypted data between homomorphic encryption and secret sharing. In this way, the homomorphic encryption and the secret sharing can be used in combination so that performance of secure multi-party computation can be improved.

A first aspect provides a secure multi-party computation method, including the following: A first party encrypts a first plaintext segment of target data by using a homomorphic encryption algorithm based on a public key held by the first party in a first key pair to obtain a first ciphertext segment. A second plaintext segment of the target data is owned by a second party. The first party sends the first ciphertext segment to the second party. The second party performs a homomorphic addition operation in the homomorphic encryption algorithm on the first ciphertext segment and the second plaintext segment of the target data to obtain ciphertext data of the target data. The ciphertext data is decrypted based on a private key in the first key pair.

A second aspect provides a secure multi-party computation method, including the following: A first plaintext segment of target data is encrypted by using a homomorphic encryption algorithm based on a public key held by the first party in a first key pair to obtain a first ciphertext segment. A second plaintext segment of the target data is owned by a second party. The first ciphertext segment is sent to the second party so that the second party performs a homomorphic addition operation in the homomorphic encryption algorithm on the first ciphertext segment and the second plaintext segment of the target data to obtain ciphertext data of the target data. The ciphertext data is decrypted based on a private key in the first key pair.

A third aspect provides a secure multi-party computation method, including the following: A first ciphertext segment is received from a first party. The first ciphertext segment is obtained by encrypting a first plaintext segment of target data by using a homomorphic encryption algorithm based on a public key held by the first party in a first key pair. A homomorphic addition operation in the homomorphic encryption algorithm is performed on the first ciphertext segment and the second plaintext segment of the target data to obtain ciphertext data of the target data. The ciphertext data is decrypted based on a private key in the first key pair.

A fourth aspect provides a secure multi-party computation method, including the following: A second party generates a first random number for ciphertext data owned by the second party, and determines, based on the first random number, a second segment of target data corresponding to the ciphertext data. The ciphertext data corresponds to data obtained by encrypting the target data by using a homomorphic encryption algorithm based on a first public key of a first party. The second party performs a homomorphic addition operation in the homomorphic encryption algorithm based on the ciphertext data and the first random number, and provides an obtained encryption operation result to the first party. The first party decrypts the encryption operation result based on a first private key corresponding to the first public key to obtain a first segment of the target data.

A fifth aspect provides a secure multi-party computation method, including the following: A first random number is generated for ciphertext data owned by a second party, and a second segment of target data corresponding to the ciphertext data is determined based on the first random number. The ciphertext data corresponds to data obtained by encrypting the target data by using a homomorphic encryption algorithm based on a first public key of a first party. A homomorphic addition operation in the homomorphic encryption algorithm is performed based on the ciphertext data and the first random number to obtain an encryption operation result. The encryption operation result is provided to the first party so that the first party decrypts the encryption operation result based on a first private key corresponding to the first public key to obtain a first segment of the target data.

A sixth aspect provides a secure multi-party computation system, including a first party and a second party.

The first party is configured to encrypt a first plaintext segment of target data by using a homomorphic encryption algorithm based on a public key held by the first party in a first key pair to obtain a first ciphertext segment. The second plaintext segment of the target data is owned by the second party.

The first party is further configured to send the first ciphertext segment to the second party.

The second party is configured to perform a homomorphic addition operation in the homomorphic encryption algorithm on the first ciphertext segment and the second plaintext segment of the target data to obtain ciphertext data of the target data. The ciphertext data is decrypted based on a private key in the first key pair.

A seventh aspect provides a secure multi-party computation apparatus, including an encryption unit and a sending unit.

The encryption unit is configured to encrypt a first plaintext segment of target data by using a homomorphic encryption algorithm based on a public key held by the first party in a first key pair to obtain a first ciphertext segment. The second plaintext segment of the target data is owned by a second party.

The sending unit is configured to send the first ciphertext segment to the second party so that the second party performs a homomorphic addition operation in the homomorphic encryption algorithm on the first ciphertext segment and the second plaintext segment of the target data to obtain ciphertext data of the target data. The ciphertext data is decrypted based on a private key in the first key pair.

An eighth aspect provides a secure multi-party computation apparatus, including a receiving unit and an operation unit.

The receiving unit is configured to receive a first ciphertext segment from a first party. The first ciphertext segment is obtained by encrypting a first plaintext segment of target data by using a homomorphic encryption algorithm based on a public key held by the first party in a first key pair.

The operation unit is configured to perform a homomorphic addition operation in the homomorphic encryption algorithm on the first ciphertext segment and the second plaintext segment of the target data to obtain ciphertext data of the target data. The ciphertext data is decrypted based on a private key in the first key pair.

A ninth aspect provides a secure multi-party computation system, including: a second party and a first party.

The second party is configured to generate a first random number for ciphertext data owned by the second party, and determine, based on the first random number, a second segment of target data corresponding to the ciphertext data. The ciphertext data corresponds to data obtained by encrypting the target data by using a homomorphic encryption algorithm based on a first public key of a first party.

The second party is further configured to perform a homomorphic addition operation in the homomorphic encryption algorithm based on the ciphertext data and the first random number, and provide an obtained encryption operation result to the first party.

The first party is configured to decrypt the encryption operation result based on a first private key corresponding to the first public key to obtain a first segment of the target data.

A tenth aspect provides a secure multi-party computation apparatus, including a generating unit, an operation unit, and a sending unit.

The generating unit is configured to generate a first random number for ciphertext data owned by a second party, and determine, based on the first random number, a second segment of target data corresponding to the ciphertext data. The ciphertext data corresponds to data obtained by encrypting the target data by using a homomorphic encryption algorithm based on a first public key of a first party.

The operation unit is configured to perform a homomorphic addition operation in the homomorphic encryption algorithm based on the ciphertext data and the first random number to obtain an encryption operation result.

The sending unit is configured to provide the encryption operation result to the first party so that the first party decrypts the encryption operation result based on a first private key corresponding to the first public key to obtain a first segment of the target data.

An eleventh aspect provides a computer-readable storage medium. The computer-readable storage medium stores a computer program. When the computer program is executed by a computer, the computer is enabled to perform the method according to any one of the first aspect to the fifth aspect.

A twelfth aspect provides a computation device, including a memory and a processor. The memory stores executable code. When the processor executes the executable code, the method according to any one of the first aspect to the fifth aspect is implemented.

One or more embodiments of this specification provide secure multi-party computation methods, apparatuses, and systems to implement mutual conversion of encrypted data between homomorphic encryption and secret sharing. In this way, the homomorphic encryption and the secret sharing can be used in combination to implement secure multi-party computation so that performance of the secure multi-party computation can be improved and diversity of the secure multi-party computation can be improved.

BRIEF DESCRIPTION OF THE DRAWINGS

To describe technical solutions in embodiments of this specification more clearly, the following briefly describes the accompanying drawings needed for describing the embodiments. Clearly, the accompanying drawings in the following description show some embodiments of this specification, and a person of ordinary skill in the art can still derive other drawings from these accompanying drawings without creative efforts.

DESCRIPTION OF EMBODIMENTS

The following describes solutions provided in this specification with reference to the accompanying drawings.

Before solutions provided in the embodiments of this specification are described, two secure multi-party computation methods: secret sharing and homomorphic encryption are first described as follows:

The secret sharing indicates that a secret is properly split, shares (also referred to as segments) obtained after the division are managed by different participants, a single participant cannot reconstruct the secret, and the secret can be reconstructed only when several participants cooperate. If a system splits a secret to n shares, the complete secret can be reconstructed based on any t shares of the secret, while no information about the secret can be obtained based on fewer than t shares of the secret. It is called a (t, n) threshold scheme (sometimes written as an (n, t) threshold scheme).

Secret sharing is a type of algorithm that can include arithmetic sharing (A-sharing) and Boolean sharing (B-sharing). Solutions in this specification are related to the A-sharing. A main idea of the A-sharing is as follows:

An original secret is a number (assume that the secret is referred to as A). Secret splitting is to split A in an addition form to satisfy $a1+a2+ \ldots +an=A$. Each $a_i$ is one secret segment. The secret segments are respectively given to different participants for maintaining. Each participant cannot obtain an original value of A through backward induction based on a value of a segment $a_i$. In this way, the secret sharing is implemented. In a state of the secret sharing, the A-sharing also supports two operations: addition and multiplication. The following first describes the addition operation based on the secret sharing.

Assume that there are two secrets A and B, and assume that each participant has local secret segments $a_i$ and $b_i$. If $C=A+B$ is to be calculated, each participant first locally calculates $a_i+b_i$ to obtain a secret segment of C. Then, the locally calculated secret segments of the participants are combined to obtain a calculation result. Certainly, secret segments of C on two participants can be further used in other calculations.

The following describes the addition operation based on the secret sharing with reference to examples.

Figure 1:
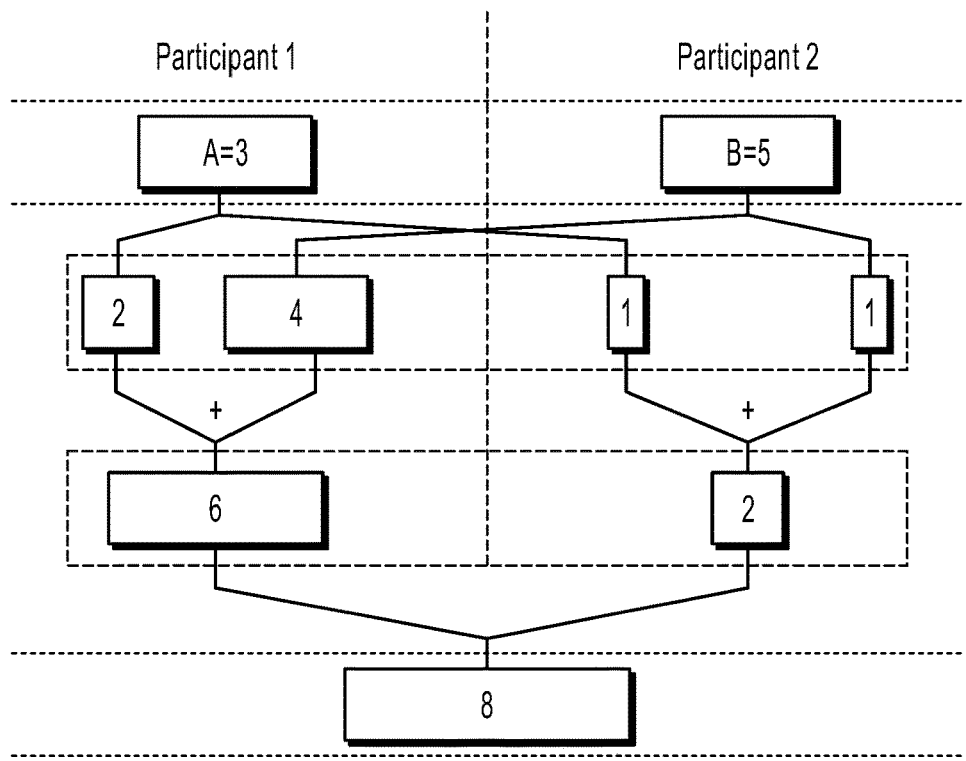
FIG. 1 is a schematic diagram illustrating an addition operation based on secret sharing, according to embodiments.

FIG. 1 is a schematic diagram illustrating an addition operation based on secret sharing, according to embodiments. In FIG. 1, participant 1 owns data A=3, and participant 2 owns data B=5. In addition, participant 1 splits A to two secret segments: a1=2 and a2=1, participant 1 owns secret segment a1=2, and participant 2 owns secret segment a2=1. Participant 2 splits B to two secret segments: b1=4 and b2=1, participant 1 owns secret segment b1=4, and participant 2 owns secret segment b2=1. If A+B is to be calculated, participant 1 can locally calculate a1+b1=2+4=6, and participant 2 can locally calculate a2+b2=1+1=2. Finally, the locally calculated segments of participant 1 and participant 2 are combined to obtain a calculation result: 6+2=8.

In the multiplication operation based on the secret sharing, in addition to two participants that own secrets, participation of a third party is usually needed. The third party is used to distribute auxiliary value pairs to the two participants. The following provides description with reference to examples.

Figure 2:
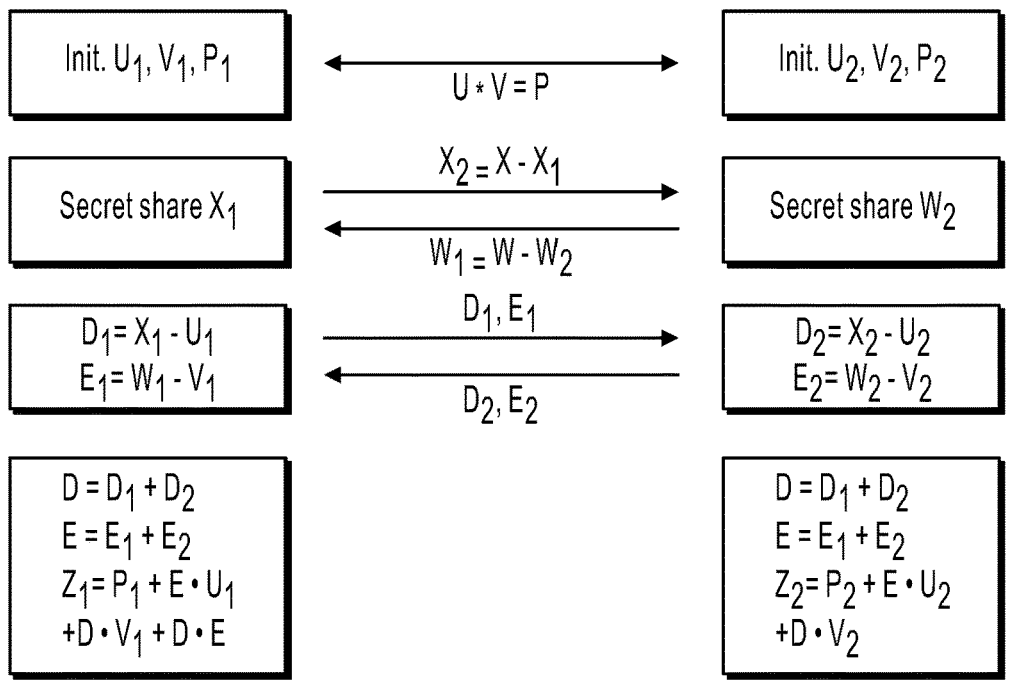
FIG. 2 is a schematic diagram illustrating a multiplication operation based on secret sharing, according to embodiments.

FIG. 2 is a schematic diagram illustrating a multiplication operation based on secret sharing, according to embodiments. In FIG. 2, participant 1 owns secret X, and participant 2 owns secret W. Before the multiplication operation starts, the third party can generate an auxiliary value pair: U1, V1, and P1 (here U1*V1=P1) and provide the auxiliary value pair to participant 1. Similarly, the third party can provide U2, V2, and P2 to participant 2. Then, in a process of the multiplication operation, participant 1 can provide secret segment X2=X−X1 of secret X to participant 2. Here, X1 is a secret segment owned by participant 1. Similarly, participant 2 can provide secret segment W1=W−W2 of secret W to participant 1. Here, W2 is a secret segment owned by participant 2. Next, participant 1 can calculate D1=X1−U1, calculate E1=W1−V1, and provide D1 and E1 to participant 2. Participant 2 provides D2 and E2 to participant 1. Therefore, participant 1 can calculate local segment Z1=P1+E*U1+D*V1+D*E. Here, D=D1+D2, and E=E1+E2. Similarly, participant 2 calculates local segment Z2=P2+E*U2+D*V2. Finally, the local segments of participant 1 and participant 2 are combined, that is, Z1+Z2 is calculated, to obtain a calculation result X*W.

It can be seen from the previous content that before the multiplication operation starts, participant 1 owns X1 and W1, and participant 2 owns X2 and W2. After the operation, participant 1 owns Z1, and participant 2 owns Z2. In other words, in the entire process of the operation, neither participant 1 nor participant 2 can determine the secret of each other.

In conclusion, a secure multi-party computation method based on the secret sharing (referred to as the method based on the secret sharing) generally includes the following steps:

First, each of the two participants splits data owned by the participant, provides one secret segment to the other participant, and keeps the other secret segment for the participant.

Second, each of the two participants performs local calculation based on the secret segment owned by the participant to obtain a result segment of the participant.

Third, the result segments of the two participants are combined to obtain a calculation result.

In conclusion, the method based on the secret sharing has the following advantages: 1. More types of calculation are supported, for example, the addition operation and the multiplication operation are supported. 2. A data volume does not increase, that is, data volumes before and after the splitting are consistent (a data volume of ciphertexts obtained in a method based on homomorphic encryption is usually far greater than a data volume of plaintexts).

The homomorphic encryption is an encryption form that allows people to obtain an encrypted result after a specific form of an algebraic operation is performed on a ciphertext. A result obtained by decrypting the encrypted result is the same as a result obtained by performing the same operation on a plaintext. In other words, this technology allows people to perform algebraic calculation on encrypted data and obtain a correct result without decrypting the data in the entire process.

Similar to the secret sharing, the homomorphic encryption is also a type of algorithm. The homomorphic encryption can be further classified to fully homomorphic encryption and partially homomorphic encryption.

The fully homomorphic encryption algorithm indicates a homomorphic encryption algorithm that supports both addition and multiplication for ciphertexts, that is, the algorithm satisfies both Enc(a)+Enc(b)=Enc(a+b) and Enc(a)*Enc(b)=Enc(a*b).

The previous partially homomorphic encryption algorithm indicates a homomorphic encryption algorithm that supports only one type of operation for ciphertexts. The partially homomorphic encryption algorithm generally can be further classified to an addition homomorphic encryption algorithm and a multiplication homomorphic encryption algorithm. The addition homomorphic encryption algorithm here can be, for example, the Paillier algorithm, the Okamoto-Uchiyama (OU) algorithm, the Damgård-Jurik (DJ) algorithm, etc. This type of algorithm satisfies Enc(a)+Enc(b)=Enc(a+b). In addition, the multiplication homomorphic encryption algorithm can satisfy Enc(a)*Enc(b)=Enc(a*b).

The addition homomorphic encryption algorithm (hereinafter referred to as AHE or HE) is used as an example in this solution to illustrate mutual conversion of encrypted data between the homomorphic encryption and the secret sharing. Therefore, the following further describes the addition homomorphic encryption algorithm.

The addition homomorphic encryption algorithm indicates that an encrypted result can be obtained after the addition operation is performed on a ciphertext, and a result obtained by decrypting the ciphertext is the same as a result obtained by performing the same operation on a plaintext. For example, Alice owns data a and data b. Alice can encrypt the original data through the AHE to obtain Enc(a) and Enc(b). Then, Alice sends ciphertexts to Bob. Bob cannot see the original data, but can directly calculate the ciphertexts. For example, Bob can calculate Enc(a)+Enc(b) that has a value equivalent to Enc(a+b). After Bob calculates Enc(a)+Enc(b), and the value is still encrypted, Bob can further perform addition operations on the ciphertexts.

Specifically, in the AHE, a public key and a private key are generated in an initialization phase. The public key is used to encrypt data and calculate ciphertexts, and the private key can be used to decrypt data. In a ciphertext operation phase, the AHE supports three operations: ciphertext+ciphertext, ciphertext+plaintext, and ciphertext*plaintext, but does not support a ciphertext*ciphertext operation.

In conclusion, a secure multi-party computation method based on the homomorphic encryption (the method based on the homomorphic encryption) generally includes the following steps:

First, participant 1 generates the public and the private key of the AHE. Data owned by participant 1 is encrypted based on the public key. A ciphertext obtained through the encryption and the public key are both provided to participant 2.

Second, participant 2 performs homomorphic computation on the received ciphertext and data owned by participant 2 to obtain an encryption operation result.

Third, participant 2 provides the encryption operation result to participant 1, and participant 1 decrypts the result based on the private key to obtain a corresponding plaintext operation result.

In conclusion, the method based on the homomorphic encryption has the following advantages: 1. The calculation process is completely local and does not depend on the network (the method based on the secret sharing usually involves several times of network communication, resulting in lower performance in a poor network). 2. Sparse matrices are supported. In the method based on the secret sharing, after the splitting, all sparse matrices become dense matrices, resulting in greatly increased data volume. In the method based on the homomorphic encryption, data owned by a ciphertext receiving party (for example, participant 2) has been locally saved, for example, the data of the party is sparse. In this case, the party can directly calculate local sparse matrices. This method has better performance than the method based on the secret sharing.

In short, the homomorphic encryption and the secret sharing each have advantages and disadvantages. To further improve performance of secure multi-party computation, the two need to be used in combination to implement complementary advantages.

The embodiments of this specification provide solutions to implement mutual conversion of encrypted data between the homomorphic encryption and the secret sharing. In this way, the homomorphic encryption and the secret sharing can be used in combination to implement secure multi-party computation so that the performance of the secure multi-party computation can be improved and diversity of the secure multi-party computation can be improved. Detailed description is provided below.

Figure 3:
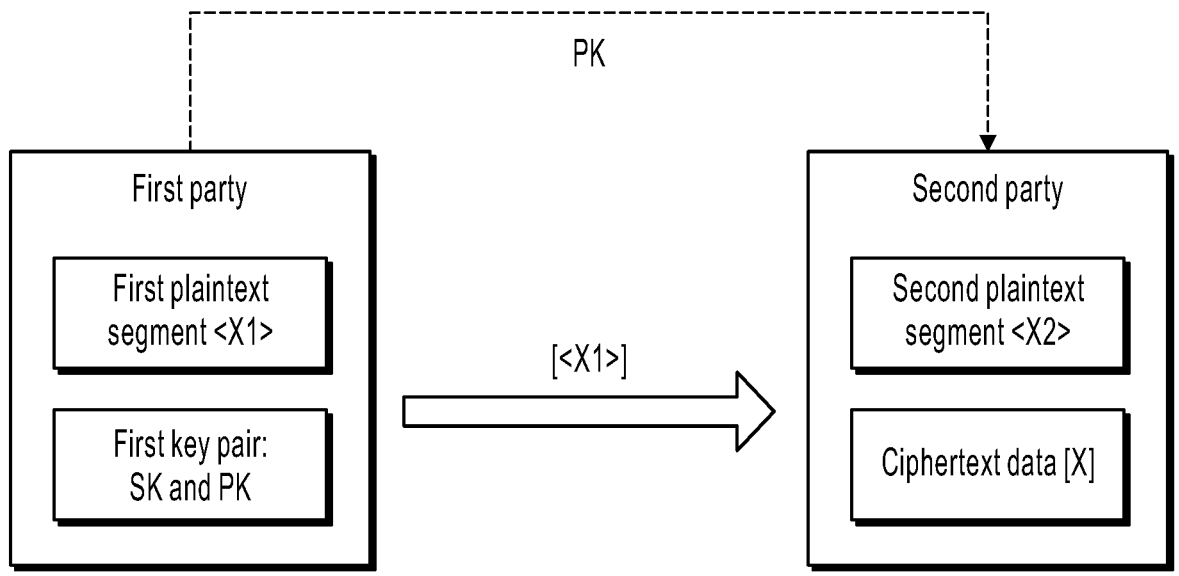
FIG. 3 is a schematic diagram illustrating an implementation scenario, according to embodiments disclosed in this specification.

FIG. 3 is a schematic diagram illustrating an implementation scenario, according to other embodiments disclosed in this specification. A first party and a second party in FIG. 3 can be implemented as any devices, platforms, servers, or device clusters with computation and processing capabilities.

In FIG. 3, the first party owns a first plaintext segment <X1> of target data X, and the second party owns a second plaintext segment <X2> of the target data X. In other words, the target data is currently in an encrypted state in secret sharing. In the embodiments of this specification, the following steps can be performed to convert encrypted data in the secret sharing to encrypted data in homomorphic encryption.

First, the first party can generate a first key pair: SK and PK in advance. Here, SK is a private key held by the first party, and PK is a public key that is publicly available. Then, the first party can encrypt the first plaintext segment <X1> by using a homomorphic encryption algorithm based on the public key SK held by the first party in the first key pair to obtain a first ciphertext segment [<X1>], and provide the first ciphertext segment to the second party. The second party can calculate [<X1>]+<X2>=[<X1>+<X2>]=[X], or calculate [<X1>]+[<X2>]=[<X1>+<X2>]=[X].

After the previous steps are performed, the second party owns ciphertext data [X] of the target data X, and the first party holds the private key SK used to decrypt the ciphertext data [X].

Certainly, the first party and the second party are also interchangeable. In other words, the second party generates the first key pair and encrypts a second ciphertext segment, and the first party performs a plaintext-ciphertext operation or an inter-ciphertext operation. It should be understood that after the first party and the second party are interchanged, the first party owns the ciphertext data [X] of the target data X, and the second party holds the private key SK used to decrypt the ciphertext data [X].

Figure 4:
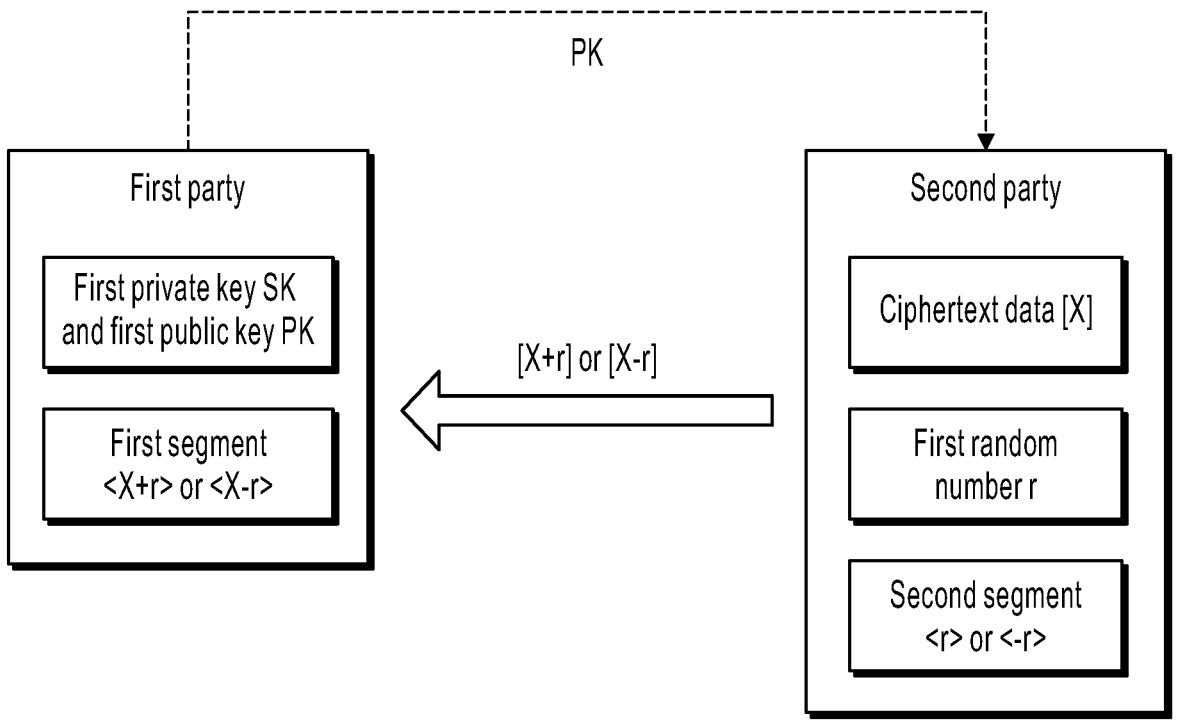
FIG. 4 is a schematic diagram illustrating an implementation scenario, according to other embodiments disclosed in this specification.

FIG. 4 is a schematic diagram illustrating an implementation scenario, according to other embodiments disclosed in this specification. A first party and a second party in FIG. 4 can be implemented as any devices, platforms, servers, or device clusters with computation and processing capabilities.

In FIG. 4, the second party owns ciphertext data [X]. The ciphertext data [X] corresponds to data obtained by encrypting the target data X by using a homomorphic encryption algorithm based on a first public key PK of the first party. The first party holds a first private key SK corresponding to the first public key PK. In other words, the target data is currently in an encrypted state in homomorphic encryption. In the embodiments of this specification, the following steps can be performed to convert encrypted data in the homomorphic encryption to encrypted data in secret sharing.

First, the second party generates a first random number r, and determines r or −r as a second segment corresponding to the target data X. Then, the second party can calculate [X]+r=[X+r] or calculate [X]−r=[X−r], and provide [X+r] or [X+r] to the first party. The first party performs decryption based on the first private key SK to obtain a first segment <X+r> or <X−r> of the target data.

In conclusion, the solutions provided in the embodiments of this specification can implement mutual conversion of encrypted data between homomorphic encryption and secret sharing.

The solutions provided in the embodiments of this specification are described in detail below by using the implementation shown in FIG. 3 as an example.

Figure 5:
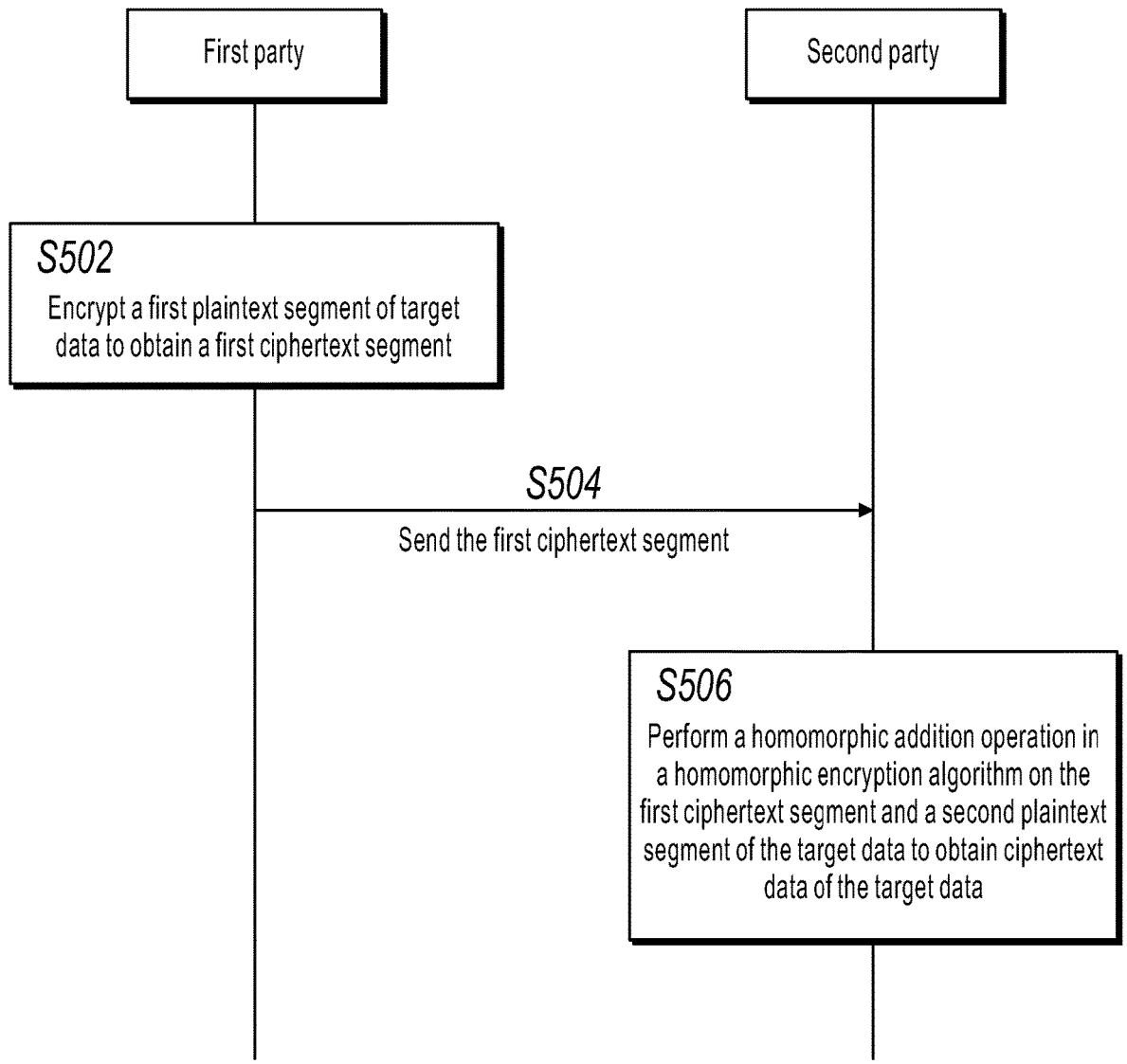
FIG. 5 is a diagram illustrating interaction in a secure multi-party computation method, according to embodiments.

FIG. 5 is a diagram illustrating interaction in a secure multi-party computation method, according to embodiments. As shown in FIG. 5, the method can include at least the following steps:

Step 502: A first party encrypts a first plaintext segment of target data by using a homomorphic encryption algorithm based on a public key held by the first party in a first key pair to obtain a first ciphertext segment.

The homomorphic encryption algorithm can be negotiated between the first party and a second party in advance. The homomorphic encryption algorithm can be, for example, the Paillier algorithm, the OU algorithm, or the DJ algorithm, etc.

Before step 502 is performed, the first party can generate corresponding parameters for the homomorphic encryption algorithm. The parameters include the public key PK and a private key SK. The public key PK and the private key SK form the first key pair. Then, the first party can encrypt the first plaintext segment <X1> of the target data X by using the homomorphic encryption algorithm based on the public key SK held by the first party in the first key pair to obtain the first ciphertext segment [<X1>].

It is worthwhile to note that a second plaintext segment <X2> of the target data X is owned by the second party.

Step 504: The first party sends the first ciphertext segment to the second party.

In an example, the first party can send both the public key PK and the first ciphertext segment [<X1>] to the second party.

Certainly, in actual applications, after generating the first key pair, the first party can alternatively send the public key PK in the first key pair to the second party.

Step 506: The second party performs a homomorphic addition operation in the homomorphic encryption algorithm on the first ciphertext segment and the second plaintext segment of the target data to obtain ciphertext data of the target data.

The ciphertext data is decrypted based on the private key in the first key pair.

In an example, performing the homomorphic addition operation in the homomorphic encryption algorithm can include performing a plaintext-ciphertext operation corresponding to the addition operation in the homomorphic encryption algorithm on the first ciphertext segment and the second plaintext segment.

In other words, [<X1>]+<X2>=[<X1>+<X2>]=[X] is calculated.

In another example, performing the homomorphic addition operation in the homomorphic encryption algorithm can include encrypting the second plaintext segment based on the public key by using the homomorphic encryption algorithm to obtain a second ciphertext segment, and performing an inter-ciphertext operation corresponding to the addition operation in the homomorphic encryption algorithm on the first ciphertext segment and the second ciphertext segment.

In other words, the second plaintext segment <X2> is first encrypted to obtain the second ciphertext segment [<X2>], and then [<X1>]+[<X2>]=[<X1>+<X2>]=[X] is calculated.

After the previous steps are performed, the second party owns ciphertext data [X] of the target data X, and the first party holds the private key SK used to decrypt the ciphertext data [X].

Certainly, the first party and the second party are also interchangeable. In other words, the second party generates the first key pair and encrypts the second ciphertext segment, and the first party performs the plaintext-ciphertext operation or the inter-ciphertext operation. It is worthwhile to understand that after the first party and the second party are interchanged, the first party owns the ciphertext data [X] of the target data X, and the second party holds the private key SK used to decrypt the ciphertext data [X].

The encrypted data in the secret sharing is converted to the encrypted data in the homomorphic encryption. In the conversion process, neither party can obtain the target data in plaintexts and the plaintext segment of the other party.

The solutions provided in the embodiments of this specification are described in detail below by using the implementation shown in FIG. 4 as an example.

Figure 6:
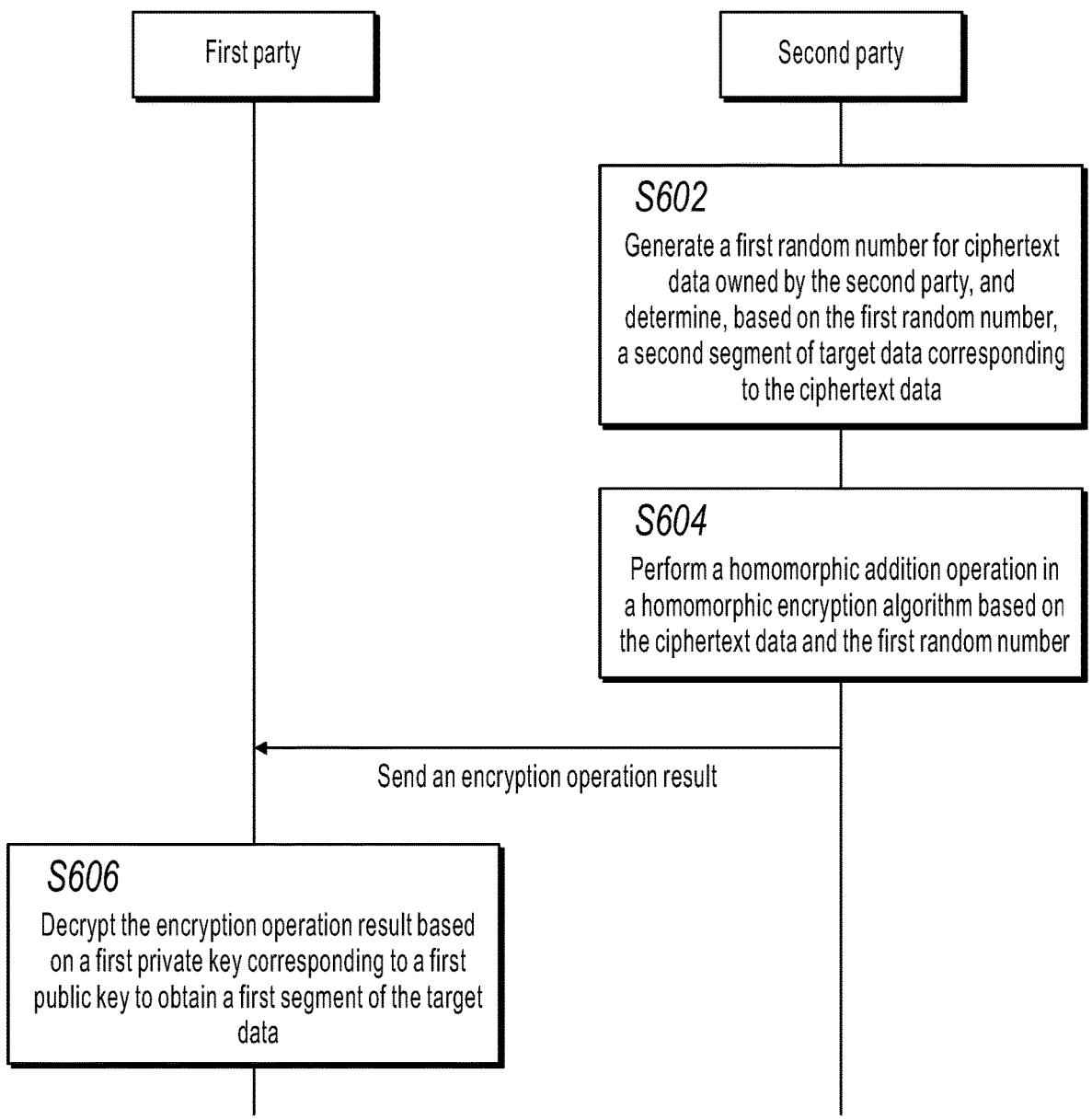
FIG. 6 is a diagram illustrating interaction in a secure multi-party computation method, according to embodiments.

FIG. 6 is a diagram illustrating interaction in a secure multi-party computation method, according to embodiments. As shown in FIG. 6, the method can include at least the following steps.

Step 602: A second party generates a first random number for ciphertext data owned by the second party, and determines, based on the first random number, a second segment of target data corresponding to the ciphertext data.

The ciphertext data [X] corresponds to data obtained by encrypting the target data X by using a homomorphic encryption algorithm based on a first public key PK of the first party. The first public key PK here can be generated by the first party for the homomorphic encryption algorithm in advance. The first public key PK has a corresponding first private key SK. The first private key SK is held by the first party. The first public key PK is publicly available.

For example, the target data X is an N-bit binary number. The first random number r can be a binary number of N+40 or more bits. For example, assume that the target data X is a 64-bit binary number. The first random number r can be a binary number of at least 104 bits. For another example, assume that the target data X is a 128-bit binary number. The first random number r can be a binary number of at least 168 bits.

It is worthwhile to note that when a quantity of bits in the first random number r exceeds a quantity of bits in the target data X by more than 40, the first random number r can be used to fully mask the target data X. In this way, security of conversion between encrypted data can be ensured.

Determining the second segment of the target data corresponding to the ciphertext data can include determining the generated first random number r as the second segment of the target data X, or determining an opposite number −r of the first random number as the second segment of the target data X.

Step 604: The second party performs a homomorphic addition operation in the homomorphic encryption algorithm based on the ciphertext data and the first random number, and provides an obtained encryption operation result to the first party.

Specifically, when the second segment is <r>, performing the homomorphic addition operation in the homomorphic encryption algorithm can include performing the homomorphic addition operation in the homomorphic encryption algorithm on the ciphertext data [X] and the opposite number −r of the first random number. When the second segment is <−r>, performing the homomorphic addition operation in the homomorphic encryption algorithm can include performing the homomorphic addition operation in the homomorphic encryption algorithm on the ciphertext data [X] and the first random number r.

It should be understood that the homomorphic addition operation can be a plaintext-ciphertext operation corresponding to the addition operation in the homomorphic encryption algorithm, or an inter-ciphertext operation corresponding to the addition operation in the homomorphic encryption algorithm.

For example, when the second segment is <r>, performing the homomorphic addition operation in the homomorphic encryption algorithm on the ciphertext data [X] and the opposite number −r of the first random number can include the following:

The plaintext-ciphertext operation corresponding to the addition operation in the homomorphic encryption algorithm is performed on the ciphertext data [X] and the opposite number −r of the first random number. In other words, [X]+(−r)=[X+(−r)] is calculated.

Alternatively, the opposite number −r of the first random number is encrypted based on the first public key PK by using the homomorphic encryption algorithm to obtain a ciphertext random number [−r]. The inter-ciphertext operation corresponding to the addition operation in the homomorphic encryption algorithm is performed on the ciphertext data [X] and the ciphertext random number [−r]. In other words, [X]+[−r]=[X+(−r)] is calculated.

It is worthwhile to note that the first public key PK here can be generated by the first party in advance and then sent to the second party.

For example, when the second segment is <−r>, performing the homomorphic addition operation in the homomorphic encryption algorithm on the ciphertext data [X] and the first random number r can include the following:

The plaintext-ciphertext operation corresponding to the addition operation in the homomorphic encryption algorithm is performed on the ciphertext data [X] and the first random number r. In other words, [X]+r=[X+r] is calculated.

Alternatively, the first random number r is encrypted based on the first public key PK by using the homomorphic encryption algorithm to obtain a ciphertext random number [r]. The inter-ciphertext operation corresponding to the addition operation in the homomorphic encryption algorithm is performed on the ciphertext data [X] and the ciphertext random number [r]. In other words, [X]+[r]=[X+r] is calculated.

Step 606: The first party decrypts the encryption operation result based on the first private key corresponding to the first public key to obtain a first segment of the target data.

To be specific, the first party decrypts [X+(−r)] or [X+r] based on the first private key SK to obtain <X−r> or <X+r> so that the first segment of the target data is <X−r> or <X+r>. Here, <X−r> corresponds to <r>, and <X+r> corresponds to <−r>.

In addition, when the first segment <X−r> corresponds to the second segment <r>, the first segment and the second segment satisfy <X−r>+<r>=X. When the first segment <X+r> corresponds to the second segment <−r>, the first segment and the second segment also satisfy <X+r>+<−r>=X.

It is worthwhile to note that because the quantity of bits in r is large enough, the first party cannot obtain X based on <X−r> or <X+r> through backward induction. In this way, data privacy protection is implemented.

The encrypted data in the homomorphic encryption is converted to the encrypted data in the secret sharing. In the conversion process, neither party can obtain the target data in plaintexts and the plaintext segment of the other party.

In conclusion, the embodiments of this specification provide solutions to implement mutual conversion of encrypted data between homomorphic encryption and secret sharing. In this way, the homomorphic encryption and the secret sharing can be used in combination to implement secure multi-party computation so that performance of the secure multi-party computation can be improved and diversity of the secure multi-party computation can be improved.

Figure 7:
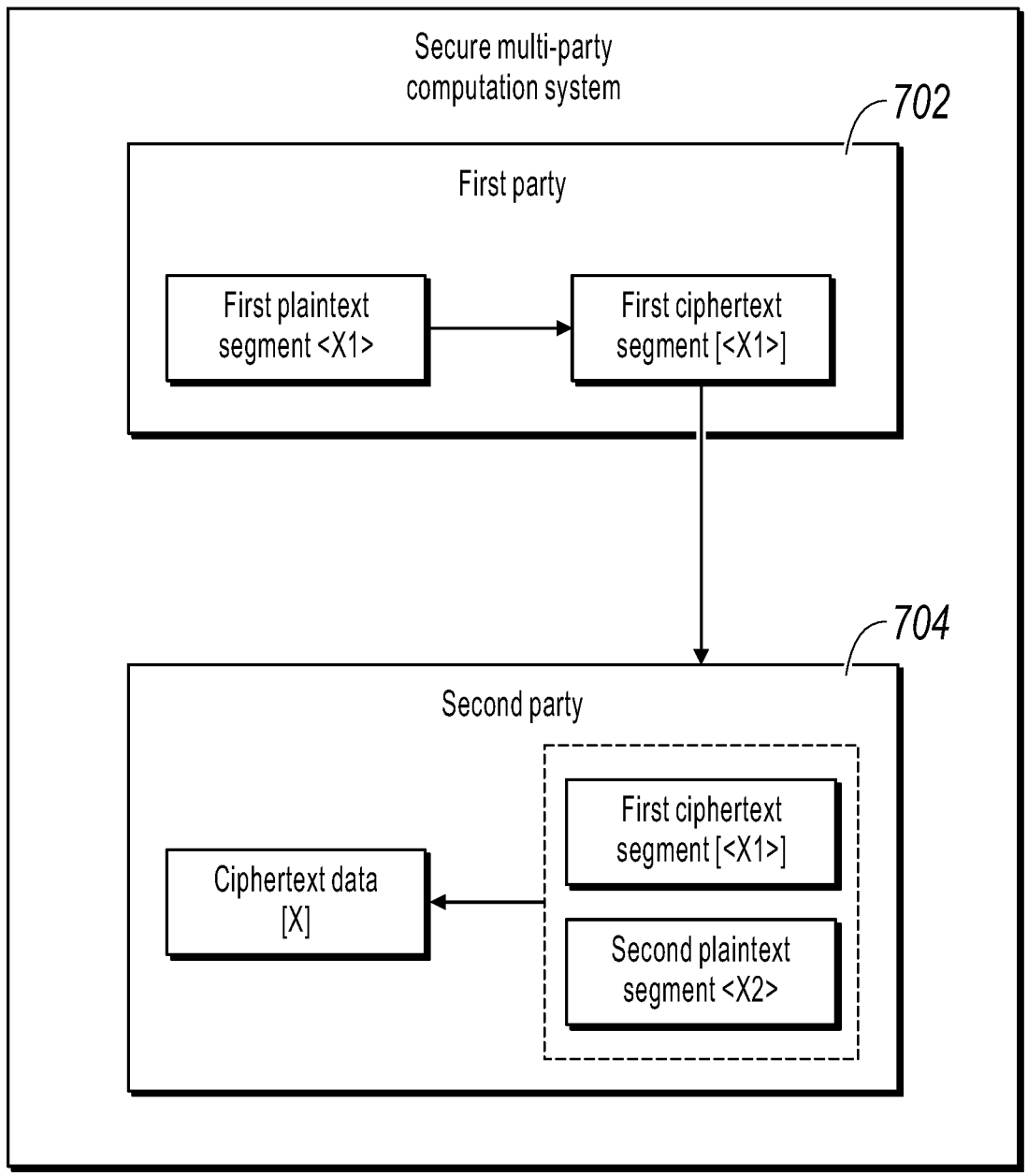
FIG. 7 is a schematic diagram illustrating a secure multi-party computation system, according to embodiments.

Corresponding to the secure multi-party computation method, embodiments of this specification further provide a secure multi-party computation system. As shown in FIG. 7, the system can include a first party 702 and a second party 704.

The first party 702 is configured to encrypt a first plaintext segment of target data by using a homomorphic encryption algorithm based on a public key held by the first party 702 in a first key pair to obtain a first ciphertext segment. A second plaintext segment of the target data is owned by the second party 704.

The first party 702 is further configured to send the first ciphertext segment to the second party 704.

The second party 704 is configured to perform a homomorphic addition operation in the homomorphic encryption algorithm on the first ciphertext segment and the second plaintext segment of the target data to obtain ciphertext data of the target data. The ciphertext data is decrypted based on a private key in the first key pair.

The second party 704 is specifically configured to perform a plaintext-ciphertext operation corresponding to the addition operation in the homomorphic encryption algorithm on the first ciphertext segment and the second plaintext segment.

The second party 704 is further specifically configured to encrypt the second plaintext segment based on the public key by using the homomorphic encryption algorithm to obtain a second ciphertext segment; and perform an inter-ciphertext operation corresponding to the addition operation in the homomorphic encryption algorithm on the first ciphertext segment and the second ciphertext segment.

The functions of the functional modules of the apparatus in the previous embodiments of this specification can be implemented through the steps in the previous method embodiments. Therefore, a specific working process of the apparatus provided in embodiments of this specification is omitted here for simplicity.

The secure multi-party computation system provided in embodiments of this specification can improve performance of secure multi-party computation.

Figure 8:
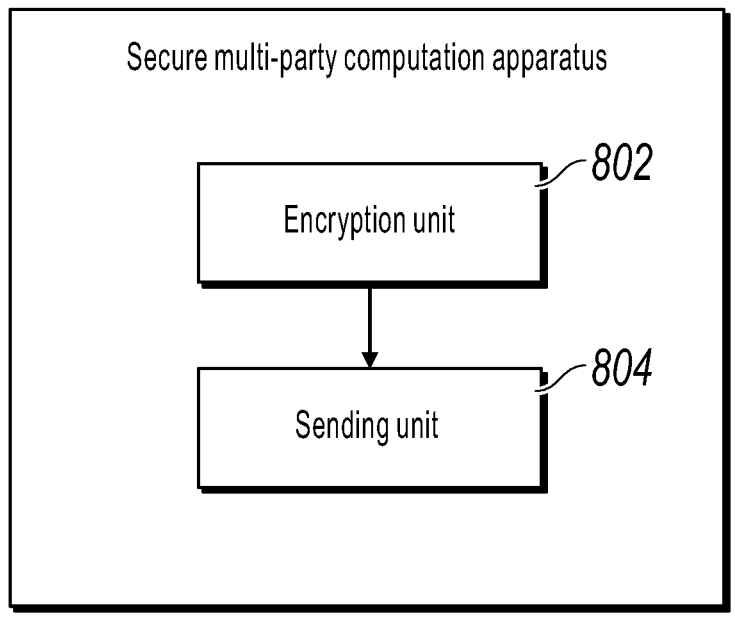
FIG. 8 is a schematic diagram illustrating a secure multi-party computation apparatus, according to embodiments.

Corresponding to the secure multi-party computation method, embodiments of this specification further provide a secure multi-party computation apparatus that is deployed on a first party. As shown in FIG. 8, the apparatus can include an encryption unit 802 and a sending unit 804.

The encryption unit 802 is configured to encrypt a first plaintext segment of target data by using a homomorphic encryption algorithm based on a public key held by the first party in a first key pair to obtain a first ciphertext segment. A second plaintext segment of the target data is owned by a second party.

The sending unit 804 is configured to send the first ciphertext segment to the second party so that the second party performs a homomorphic addition operation in the homomorphic encryption algorithm on the first ciphertext segment and the second plaintext segment of the target data to obtain ciphertext data of the target data. The ciphertext data is decrypted based on a private key in the first key pair.

The functions of the functional modules of the apparatus in the previous embodiments of this specification can be implemented through the steps in the previous method embodiments. Therefore, a specific working process of the apparatus provided in embodiments of this specification is omitted here for simplicity.

The secure multi-party computation apparatus provided in embodiments of this specification can improve performance of secure multi-party computation.

Figure 9:
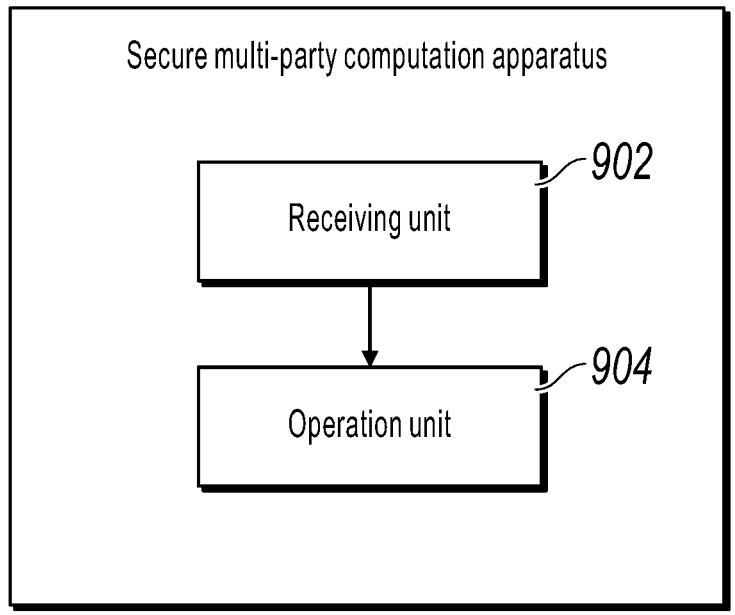
FIG. 9 is a schematic diagram illustrating a secure multi-party computation apparatus, according to other embodiments.

Corresponding to the secure multi-party computation method, embodiments of this specification further provide a secure multi-party computation apparatus that is disposed on a second party. As shown in FIG. 9, the apparatus can include a receiving unit 902 and an operation unit 904.

The receiving unit 902 is configured to receive a first ciphertext segment from a first party. The first ciphertext segment is obtained by encrypting a first plaintext segment of target data by using a homomorphic encryption algorithm based on a public key held by the first party in a first key pair.

The operation unit 904 is configured to perform a homomorphic addition operation in the homomorphic encryption algorithm on the first ciphertext segment and a second plaintext segment of the target data to obtain ciphertext data of the target data. The ciphertext data is decrypted based on a private key in the first key pair.

The functions of the functional modules of the apparatus in the previous embodiments of this specification can be implemented through the steps in the previous method embodiments. Therefore, a specific working process of the apparatus provided in embodiments of this specification is omitted here for simplicity.

The secure multi-party computation apparatus provided in embodiments of this specification can improve performance of secure multi-party computation.

Figure 10:
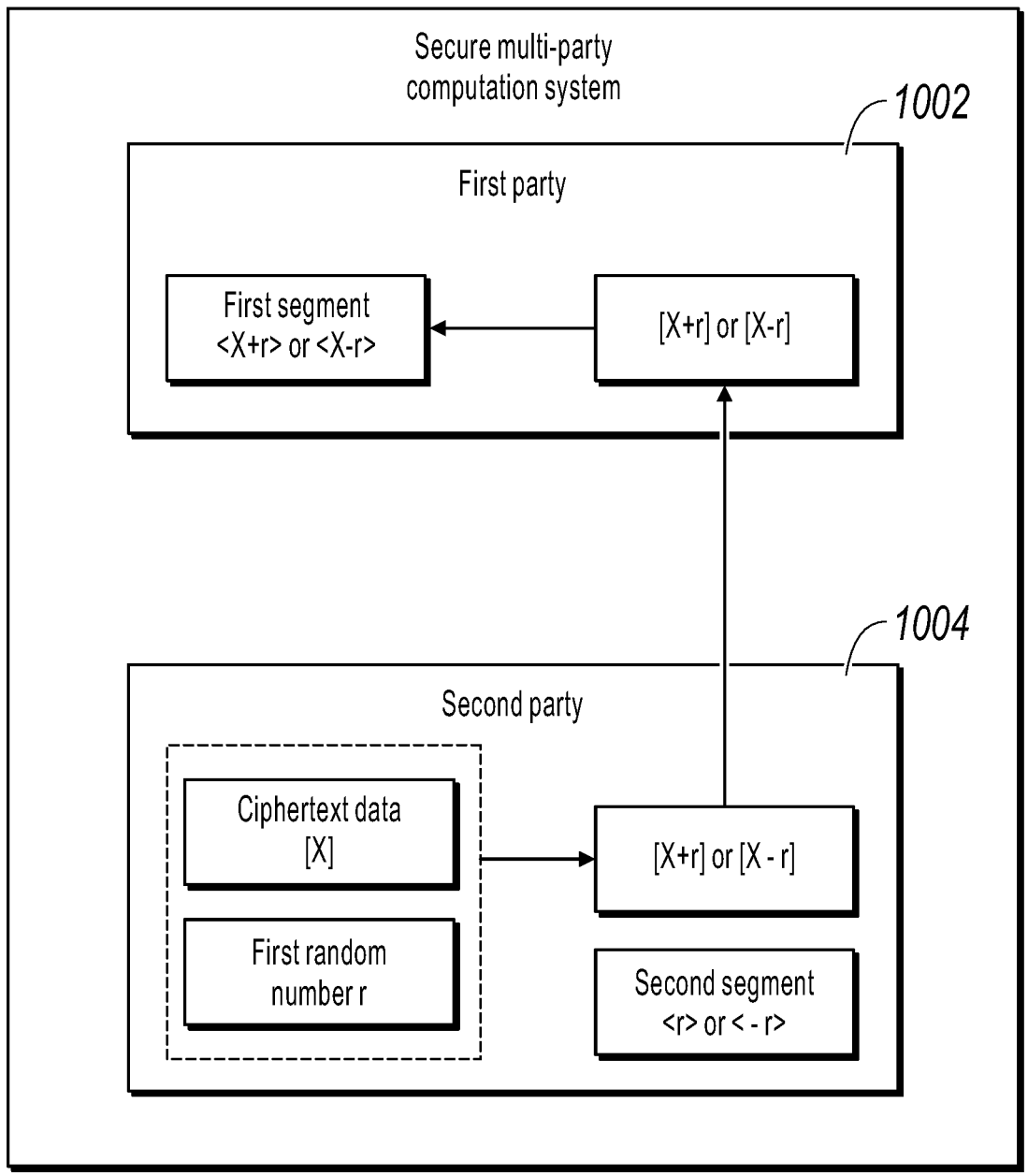
FIG. 10 is a schematic diagram illustrating a secure multi-party computation system, according to other embodiments.

Corresponding to the secure multi-party computation method, embodiments of this specification further provide a secure multi-party computation system. As shown in FIG. 10, the system can include a first party 1002 and a second party 1004.

The second party 1004 is configured to generate a first random number for ciphertext data owned by the second party 1004, and determine, based on the first random number, a second segment of target data corresponding to the ciphertext data. The ciphertext data corresponds to data obtained by encrypting the target data by using a homomorphic encryption algorithm based on a first public key of the first party 1002.

The second party 1004 is specifically configured to determine the first random number as the second segment of the target data.

The second party 1004 is further specifically configured to determine an opposite number of the first random number as the second segment of the target data.

The second party 1004 is further configured to perform a homomorphic addition operation in the homomorphic encryption algorithm based on the ciphertext data and the first random number, and provide an obtained encryption operation result to the first party 1002.

The second party 1004 is specifically configured to perform the homomorphic addition operation in the homomorphic encryption algorithm on the ciphertext data and an opposite number of the first random number.

The second party 1004 is further specifically configured to perform the homomorphic addition operation in the homomorphic encryption algorithm on the ciphertext data and the first random number.

The second party 1004 is further specifically configured to perform a plaintext-ciphertext operation corresponding to the addition operation in the homomorphic encryption algorithm on the ciphertext data and the first random number.

The second party 1004 is further specifically configured to encrypt the first random number based on the first public key by using the homomorphic encryption algorithm to obtain a ciphertext random number; and perform an inter-ciphertext operation corresponding to the addition operation in the homomorphic encryption algorithm on the ciphertext data and the ciphertext random number.

The first party 1002 is configured to decrypt the encryption operation result based on a first private key corresponding to the first public key to obtain a first segment of the target data.

The functions of the functional modules of the apparatus in the previous embodiments of this specification can be implemented through the steps in the previous method embodiments. Therefore, a specific working process of the apparatus provided in embodiments of this specification is omitted here for simplicity.

The secure multi-party computation system provided in embodiments of this specification can improve performance of secure multi-party computation.

Figure 11:
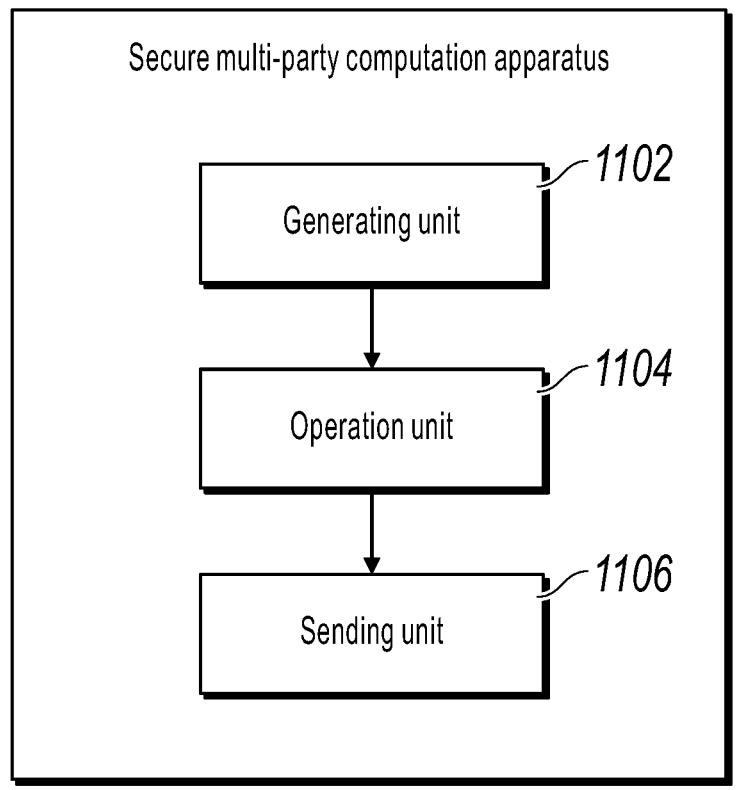
FIG. 11 is a schematic diagram illustrating a secure multi-party computation apparatus, according to other embodiments.

Corresponding to the secure multi-party computation method, embodiments of this specification further provide a secure multi-party computation apparatus that is disposed on a second party. As shown in FIG. 11, the apparatus can include a generating unit 1102, an operation unit 1104, and a sending unit 1106.

The generating unit 1102 is configured to generate a first random number for ciphertext data owned by the second party, and determine, based on the first random number, a second segment of target data corresponding to the ciphertext data. The ciphertext data corresponds to data obtained by encrypting the target data by using a homomorphic encryption algorithm based on a first public key of a first party.

The operation unit 1104 is configured to perform a homomorphic addition operation in the homomorphic encryption algorithm based on the ciphertext data and the first random number to obtain an encryption operation result.

The sending unit 1106 is configured to provide the encryption operation result to the first party so that the first party decrypts the encryption operation result based on a first private key corresponding to the first public key to obtain a first segment of the target data.

The functions of the functional modules of the apparatus in the previous embodiments of this specification can be implemented through the steps in the previous method embodiments. Therefore, a specific working process of the apparatus provided in embodiments of this specification is omitted here for simplicity.

The secure multi-party computation apparatus provided in embodiments of this specification can improve performance of secure multi-party computation.

Embodiments in other aspects further provide a computer-readable storage medium. The computer-readable storage medium stores a computer program. When the computer program is executed by a computer, the computer is enabled to perform the method described with reference to FIG. 5 or FIG. 6.

Embodiments in other aspects further provide a computation device, including a memory and a processor. The memory stores executable code. When the processor executes the executable code, the method described with reference to FIG. 5 or FIG. 6 is implemented.

The embodiments in this specification are described in a progressive way, the same and similar parts between the embodiments can refer to each other, and each embodiment focuses on the differences from other embodiments. In particular, because the device embodiments are basically similar to the method embodiments, the device embodiments are relatively simply described. References can be made to the description of the method embodiment parts for relevant parts.

The methods or the algorithm steps described in the disclosed content of this specification can be implemented in hardware, or in a way of executing software instructions by a processor. The software instructions can include corresponding software modules. The software modules can be stored in a random access memory (RAM), flash memory, a read-only memory (ROM), an erasable programmable read-only memory (EPROM), an electrically erasable programmable read-only memory (EEPROM), a register, a hard disk, a portable hard disk, a compact disc read-only memory (CD-ROM), or any other form of storage medium known in the art. An illustrative storage medium is coupled to a processor so that the processor can read information from the storage medium and write information to the storage medium. Certainly, the storage medium can be alternatively a part of the processor. The processor and the storage medium can be located in an ASIC. In addition, the ASIC can be located in a server. Certainly, the processor and the storage medium can be discrete components located in a server.

A person skilled in the art should be aware that, in the previous one or more examples, functions described in this application can be implemented by hardware, software, firmware, or any combination thereof. When this application is implemented by the software, the functions can be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium can be any available medium accessible to a general-purpose computer or a special-purpose computer.

The previous describes specific embodiments of this specification. Other embodiments fall within the scope of the appended claims. In some cases, the actions or the steps described in the claims can be performed in a sequence different from that in the embodiments and can still obtain desired results. In addition, the processes depicted in the drawings are not necessarily performed in a shown particular sequence or a shown consecutive sequence to obtain desired results. In certain embodiments, multitasking processing and parallel processing can also be possible or can be advantageous.

The objectives, technical solutions, and beneficial effects of this specification have been further described in detail in the previous specific implementations. It should be understood that the previous description is merely specific implementations of this specification and do not intend to limit the protection scope of this specification. Any modification, equivalent replacement, improvement, etc. made based on the technical solutions of this specification shall fall within the protection scope of this specification.

What is claimed is:

1. A computer-implemented method for secure multi-party computation method, comprising:
    encrypting, by a first device of a first party, a first plaintext segment of target data by using a homomorphic encryption algorithm based on a public key held by the first party in a first key pair to obtain a first ciphertext segment, wherein a second plaintext segment of the target data is held by a second party; and
    sending, by the first device of the first party, the first ciphertext segment to a second device of the second party, wherein a homomorphic addition operation in the homomorphic encryption algorithm is performed on the first ciphertext segment and the second plaintext segment of the target data to obtain ciphertext data of the target data, and wherein the homomorphic addition operation in the homomorphic encryption algorithm is performed on the first ciphertext segment and the second plaintext segment of the target data by operations comprising:
        encrypting the second plaintext segment based on the public key by using the homomorphic encryption algorithm to obtain a second ciphertext segment; and
        performing an inter-ciphertext operation corresponding to the homomorphic addition operation in the homomorphic encryption algorithm on the first ciphertext segment and the second ciphertext segment.

2. The computer-implemented method according to claim 1, wherein the ciphertext data is decrypted based on a private key in the first key pair.

3. The computer-implemented method according to claim 1, further comprising:
    performing, by the second device of the second party, the homomorphic addition operation in the homomorphic encryption algorithm on the first ciphertext segment and the second plaintext segment of the target data to obtain the ciphertext data of the target data.

4. The computer-implemented method according to claim 1, wherein before the encrypting a first plaintext segment of target data, the computer-implemented method further comprises:
    generating, by the first device of the first party, the first key pair for the homomorphic encryption algorithm.

5. The computer-implemented method according to claim 1, further comprising:
    sending, by the first device of the first party, the public key to the second device of the second party.

6. The computer-implemented method according to claim 1, wherein the homomorphic encryption algorithm comprises one of following: Paillier algorithm, Okamoto-Uchiyama (OU) algorithm, or Damgård-Jurik (DJ) algorithm.

7. A computer-implemented method, performed by a second device of a second party, comprising:
    receiving a first ciphertext segment from a first device of a first party, wherein the first ciphertext segment is obtained by encrypting a first plaintext segment of target data by using a homomorphic encryption algorithm based on a public key held by the first party in a first key pair; and
    performing a homomorphic addition operation in the homomorphic encryption algorithm on the first ciphertext segment and a second plaintext segment of the target data to obtain ciphertext data of the target data, wherein the homomorphic addition operation in the homomorphic encryption algorithm is performed on the first ciphertext segment and the second plaintext segment of the target data by operations comprising:
        encrypting the second plaintext segment based on the public key by using the homomorphic encryption algorithm to obtain a second ciphertext segment; and
        performing an inter-ciphertext operation corresponding to the homomorphic addition operation in the homomorphic encryption algorithm on the first ciphertext segment and the second ciphertext segment.

8. The computer-implemented method according to claim 7, wherein the ciphertext data is decrypted based on a private key in the first key pair.

9. The computer-implemented method according to claim 7, further comprising:
receiving the public key from the first device of the first party.

10. The computer-implemented method according to claim 7, wherein the homomorphic encryption algorithm comprises one of following: Paillier algorithm, Okamoto-Uchiyama (OU) algorithm, or Damgård-Jurik (DJ) algorithm.

11. A computer-implemented method, comprising:
generating, by a second device of a second party, a first random number for ciphertext data owned by the second party;
determining, by the second device of the second party based on the first random number, a second segment of target data corresponding to the ciphertext data, wherein the ciphertext data corresponds to data obtained by encrypting the target data using a homomorphic encryption algorithm based on a first public key of a first party;
performing, by the second device of the second party, a homomorphic addition operation in the homomorphic encryption algorithm based on the ciphertext data and the first random number; and
providing, by the second device of the second party, an encryption operation result to a first device of the first party.

12. The computer-implemented method according to claim 11, further comprising:
obtaining, by the first device of the first party, a first segment of the target data by decrypting the encryption operation result based on a first private key corresponding to the first public key.

13. The computer-implemented method according to claim 11, wherein the determining a second segment of target data corresponding to the ciphertext data comprises:
determining the first random number as the second segment of the target data.

14. The computer-implemented method according to claim 13, wherein the performing a homomorphic addition operation in the homomorphic encryption algorithm based on the ciphertext data and the first random number comprises:
performing the homomorphic addition operation in the homomorphic encryption algorithm on the ciphertext data and an opposite number of the first random number.

15. The computer-implemented method according to claim 11, wherein the determining a second segment of target data corresponding to the ciphertext data comprises:
determining an opposite number of the first random number as the second segment of the target data.

16. The computer-implemented method according to claim 15, wherein the performing a homomorphic addition operation in the homomorphic encryption algorithm based on the ciphertext data and the first random number comprises:
performing the homomorphic addition operation in the homomorphic encryption algorithm on the ciphertext data and the first random number.

17. The computer-implemented method according to claim 16, wherein the performing the homomorphic addition operation in the homomorphic encryption algorithm on the ciphertext data and the first random number comprises:
performing a plaintext-ciphertext operation corresponding to the homomorphic addition operation in the homomorphic encryption algorithm on the ciphertext data and the first random number.

18. The computer-implemented method according to claim 16, wherein the performing the homomorphic addition operation in the homomorphic encryption algorithm on the ciphertext data and the first random number comprises:
encrypting the first random number based on the first public key by using the homomorphic encryption algorithm to obtain a ciphertext random number; and
performing an inter-ciphertext operation corresponding to the homomorphic addition operation in the homomorphic encryption algorithm on the ciphertext data and the ciphertext random number.

19. The computer-implemented method according to claim 11, further comprising:
receiving, by the second device of the second party, the first public key from the first device of the first party.

20. The computer-implemented method according to claim 11, wherein the homomorphic encryption algorithm comprises one of following: Paillier algorithm, Okamoto-Uchiyama (OU) algorithm, or Damgård-Jurik (DJ) algorithm.

* * * * *